Figure 1:
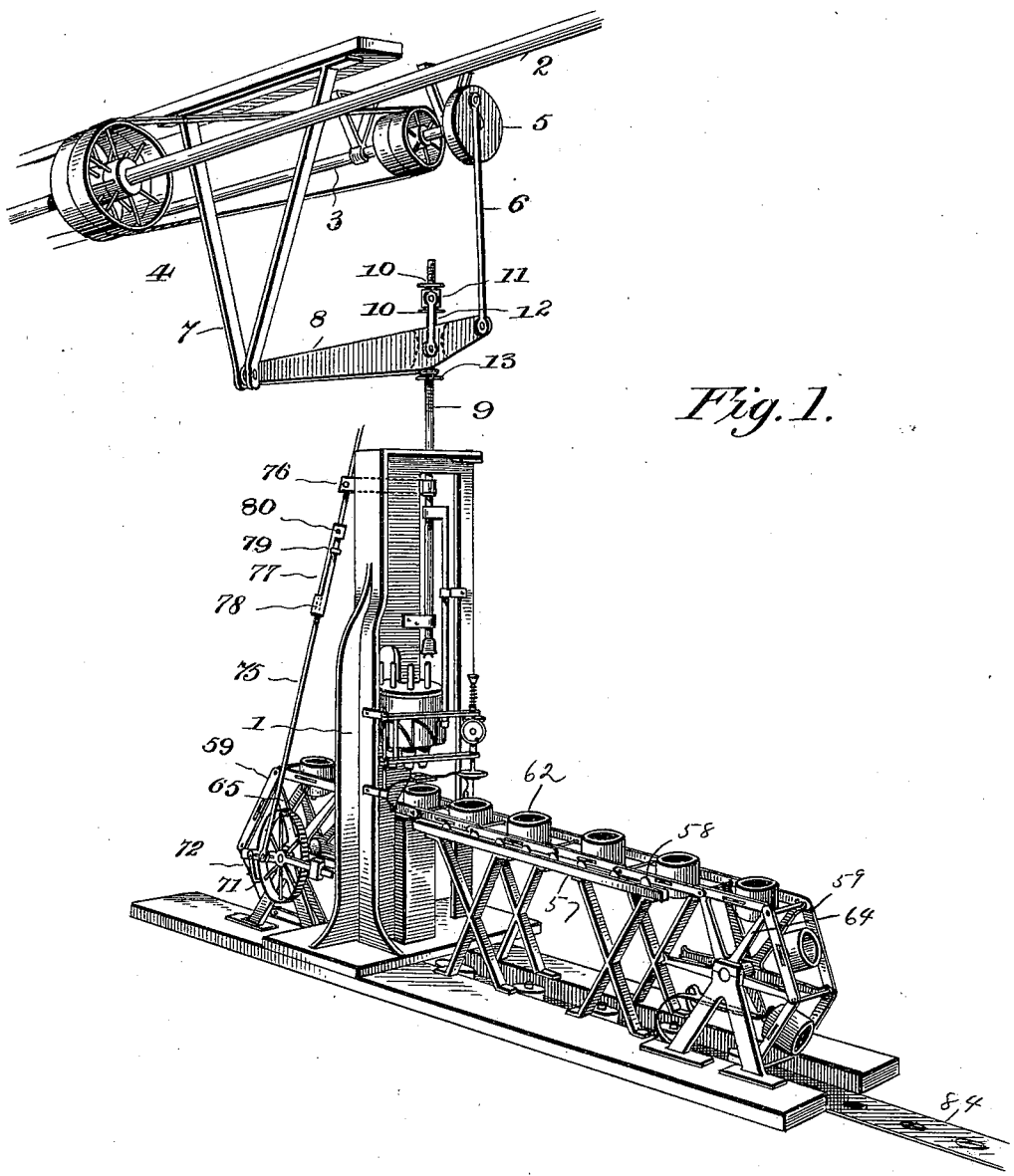

No. 622,270. Patented Apr. 4, 1899.
J. T. ROWE.
MACHINE FOR MAKING HOLLOW GLASSWARE.
(Application filed Nov. 26, 1897. Renewed Feb. 16, 1899.)
(No Model.) 5 Sheets—Sheet 1.

Witnesses: L. C. Hills, W. A. Robert

Inventor: John T. Rowe
By Glancock & Co. Attys.

No. 622,270. Patented Apr. 4, 1899.
J. T. ROWE.
MACHINE FOR MAKING HOLLOW GLASSWARE.
(Application filed Nov. 26, 1897. Renewed Feb. 16, 1899.)
(No Model.) 5 Sheets—Sheet 2.

Witnesses:
L. C. Hills
W. A. Roberts

Inventor:
John T. Rowe
By Glaurchder
Attys

No. 622,270. Patented Apr. 4, 1899.
J. T. ROWE.
MACHINE FOR MAKING HOLLOW GLASSWARE.
(Application filed Nov. 26, 1897. Renewed Feb. 16, 1899.)
(No Model.) 5 Sheets—Sheet 3.
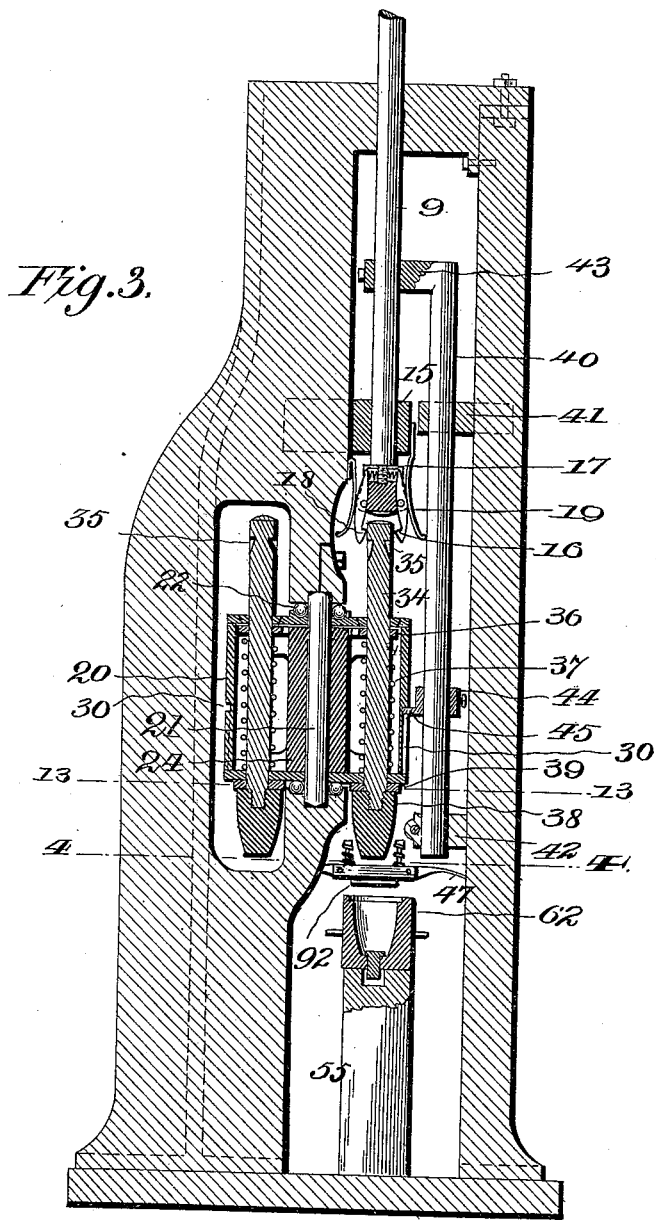
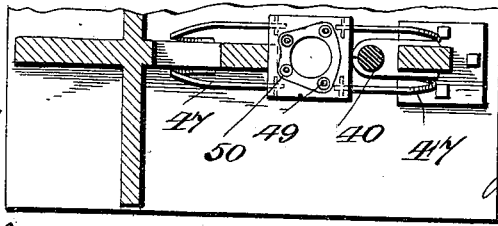
Witnesses: Inventor:
L. C. Hills John T. Rowe
W. A. Roberts By Blanchard
Atty's No. 622,270. Patented Apr. 4, 1899.
J. T. ROWE.
MACHINE FOR MAKING HOLLOW GLASSWARE.
(Application filed Nov. 26, 1897. Renewed Feb. 16, 1899.)
(No Model.) 5 Sheets—Sheet 4.
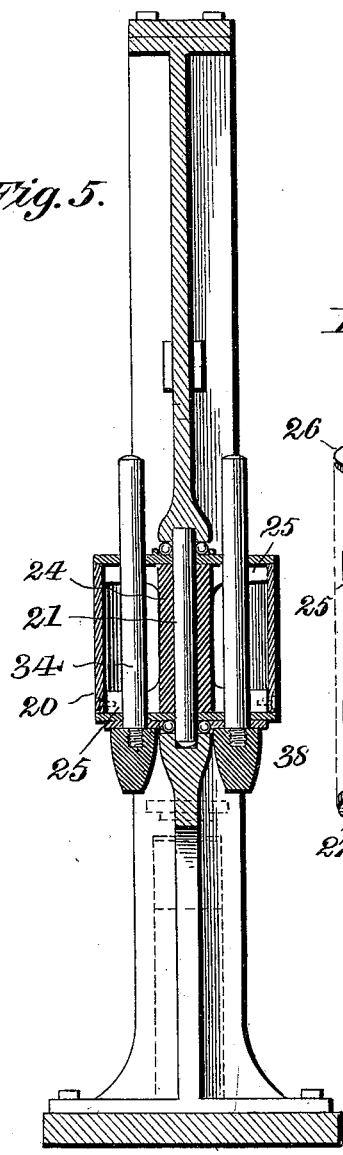
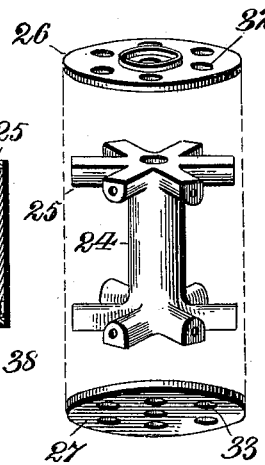
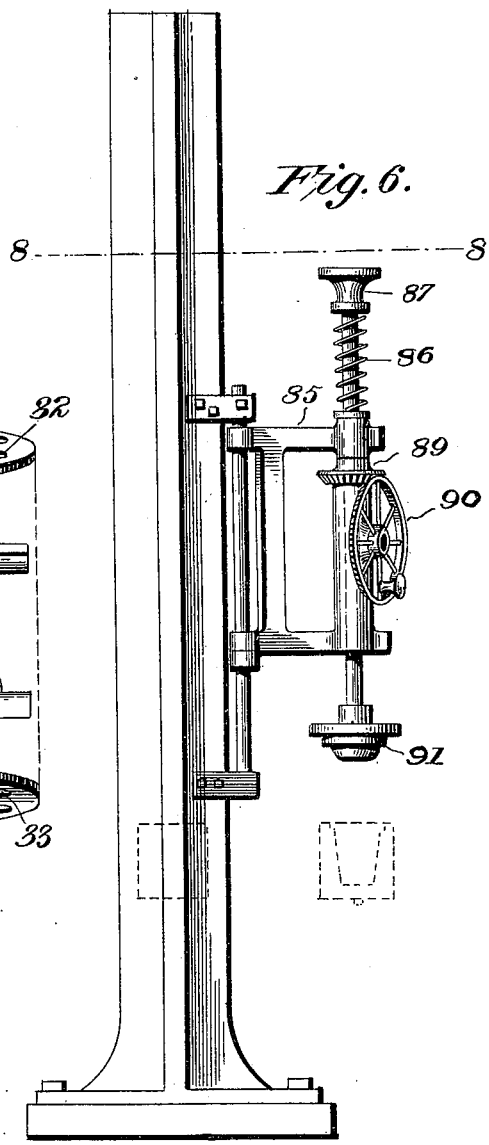
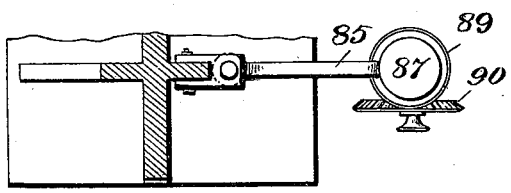
Witnesses:
L. C. Hills.
W. A. Roberts.
Inventor:
John T. Rowe
By Glascock & Co.
Att'ys.
THE NORRIS PETERS CO., PHOTO-LITHO., WASHINGTON, D. C.

No. 622,270. Patented Apr. 4, 1899.
J. T. ROWE.
MACHINE FOR MAKING HOLLOW GLASSWARE.
(Application filed Nov. 26, 1897. Renewed Feb. 16, 1899.)

(No Model.) 5 Sheets—Sheet 5.

Witnesses:
L. H. Hills
W. A. Roberts

Inventor:
John T. Rowe
By Glanschied & Co.
Attys.

THE NORRIS PETERS CO., PHOTO-LITHO., WASHINGTON, D. C.

UNITED STATES PATENT OFFICE.

JOHN T. ROWE, OF CICERO, INDIANA.

MACHINE FOR MAKING HOLLOW GLASSWARE.

SPECIFICATION forming part of Letters Patent No. 622,270, dated April 4, 1899.

Application filed November 26, 1897. Renewed February 16, 1899. Serial No. 705,692. (No model.)

*To all whom it may concern:*

Be it known that I, JOHN T. ROWE, a citizen of the United States, residing at Cicero, in the county of Hamilton and State of Indiana, have invented certain new and useful Improvements in Machines for Making Hollow Glassware; and I do hereby declare the following to be a full, clear, and exact description of the invention, such as will enable others skilled in the art to which it appertains to make and use the same.

My invention has relation to machines for making hollow glassware; and it consists in the novel construction and arrangement of its parts, as hereinafter described.

The object of the invention is to provide a machine for making hollow glassware—such as tumblers, goblets, jars, &c.—the articles being made and completed in very rapid succession.

The machine consists of a set of revolving plungers adapted to coact with a set of molds mounted on an endless chain, the plungers revolving horizontally over the molds and the molds traveling horizontally and passing around suitable wheels. The product from the molds is deposited upon a suitable belt, and by means of said belt the articles are conveyed to the leers. The power for operating the plungers both perpendicularly and in their revolving motion and the power for moving the molds are both derived from the same source—that is, a suitable means is provided above the machine for causing a perpendicular rod to reciprocate, and the reciprocation of this rod furnishes the power for the moving parts, as above intimated.

Figure 2:
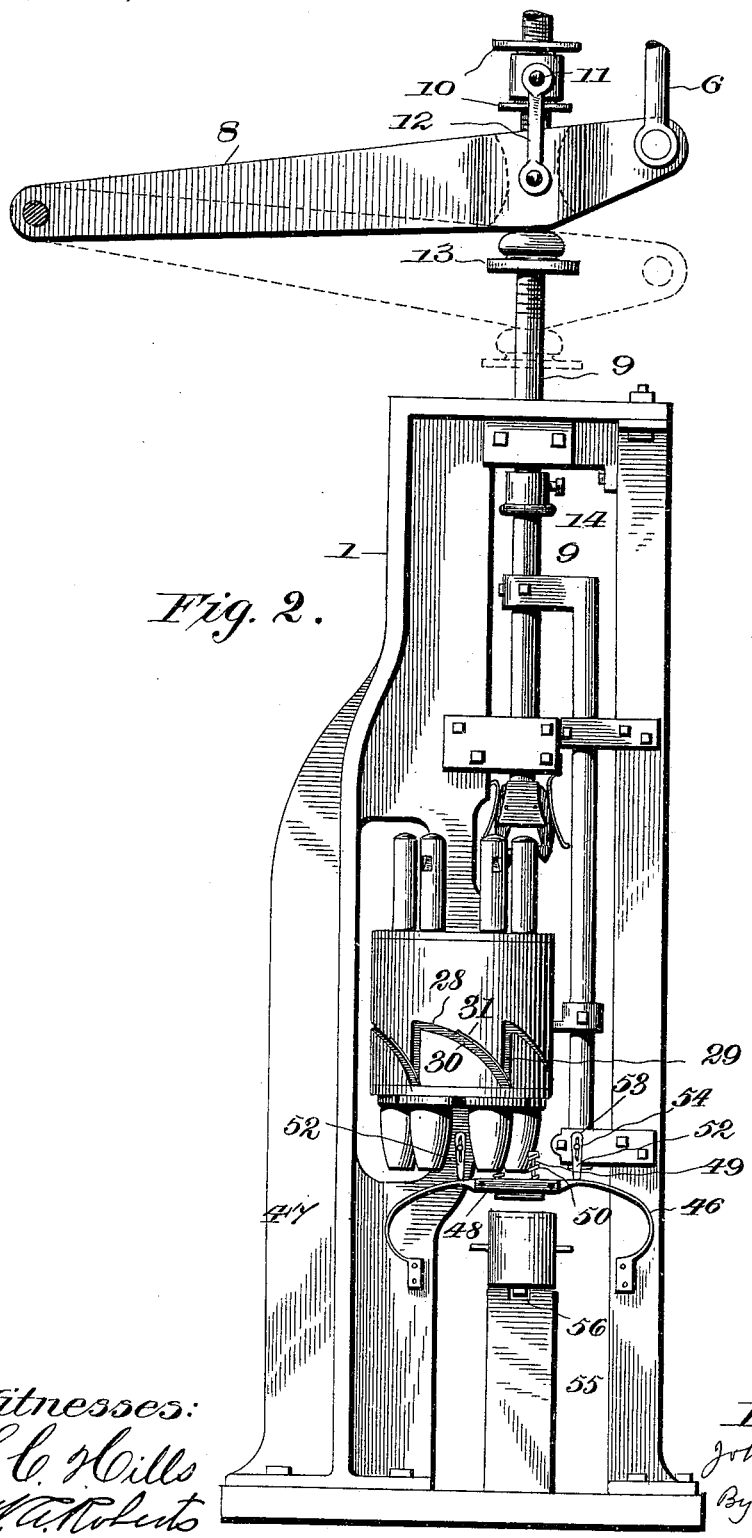
Figure 9:
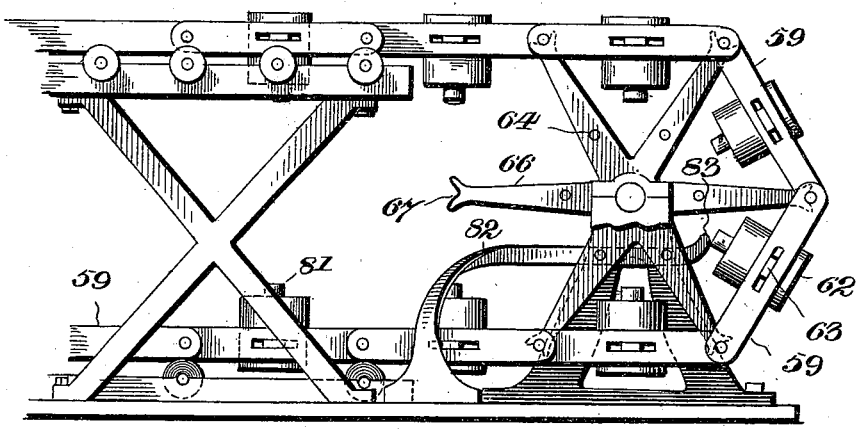
Figure 10:
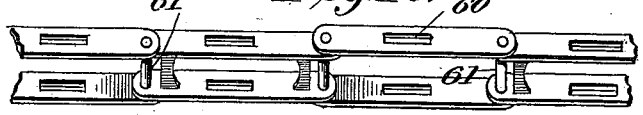
Figure 11:
Figure 12:
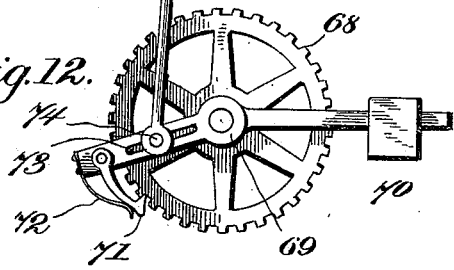
Figure 13:
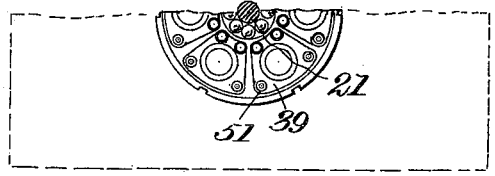

In the accompanying drawings, Figure 1 is a perspective view of the complete machine. Fig. 2 is a side elevation of the machine, showing the revolving plungers. Fig. 3 is a transverse sectional view of the machine. Fig. 4 is a horizontal sectional view cut on the line 4 4 of Fig. 3. Fig. 5 is also a transverse sectional view cut at right angles to the view shown in Fig. 3. Fig. 6 is a perspective view showing the finishing device. Fig. 7 is a perspective view showing the core and end plates of the plunger-cylinder. Fig. 8 is a horizontal sectional view cut on the line 8 8 of Fig. 6. Fig. 9 is a side elevation of one end of the mold-chain. Fig. 10 is a perspective view of a section of the mold-chain. Fig. 11 is a perspective view of one of the molds. Fig. 12 is a side elevation of the ratchet mechanism adapted to operate the mold-chain, and Fig. 13 is a bottom plan view of the plunger-cylinder.

The machine consists of the upright frame 1, and the means shown in Fig. 1 for operating the machine consists of a line-shaft 2 and a counter-shaft 3, the pulleys on the respective shafts being surrounded by a belt 4. A disk 5 is fixed to the counter-shaft 3, and a pitman 6 is pivoted to the said disk. A frame 7 is suitably secured at its upper end, and the lever 8 is fulcrumed to said frame 7. The lower end of the pitman 6 is pivotally connected to the end of the lever 8. The rod 9 passes perpendicularly through the lever 8, the said rod being provided at its upper end with a thread, said thread passing through the jam-nuts 10 10. The collar 11 is located between the said jam-nuts 10 10, and the links 12 connect the said collar 11 with the side of the lever 8, the connections at each end of said link 12 being pivotal points. The lock-nut 13 is also located on the rod 9, the said nut 13 having on its upper face a convexity adapted to come in contact with the lower edge of the lever 8. Through the mechanism above described a reciprocating motion is imparted to the rod 9. However, this mechanism may be substituted by an automatic cylinder, the said cylinder having its piston connected direct to the rod 9, or any other suitable means may be provided whereby the said rod 9 is given a reciprocating motion. The rod 9 passes perpendicularly through a suitable perforation in the top of the frame 1, the said rod being provided with an adjustable collar 14, the said collar being adapted to come in contact with the lower edge of the upper portion of the frame 1 and thus limit the upward movement of the rod 9. The lower portion of the rod 9 passes through the guide 15, said guide being attached to the frame 1, and the lower end of the rod 9 is provided with the pivoted grippers 16, said grippers being oppositely disposed and having interposed between their upper ends and a portion of the rod the springs 17, the tendency of said springs being to keep the upper ends of the grippers 16 apart from each other as far as possible and their lower ends as near as possible together. The lower ends of the grippers 16 are provided with the inward extensions 18, and the outer edges of the grippers 16 are substantially convex, the object of which will be hereinafter stated. The flat springs 19 19 are attached at their upper ends at suitable stationary points, the said flat springs 19 being located in the upper portions of the paths of the grippers 16, the tension of the springs 19 being greater than the tension of the springs 17. Thus when the upper ends of the grippers 16 come in contact with the springs 19 the upper ends of the said grippers are thus forced away from each other, the object of which will be hereinafter stated.

The plunger-cylinder 20 is located at an intermediate portion of the framework 1. Said cylinder 20 is adapted to revolve horizontally and is mounted on the axle 21, the ball-bearings 22 and 23 being interposed between the bearing-surfaces at the upper and lower heads, respectively, of the cylinder 20 and the framework, as illustrated in Fig. 3. The cylinder 20 consists of the central core 24, said core having a central perforation adapted to receive the axle 21, said core having at its upper and lower ends radially-extending arms 25, as shown in detail in Fig. 7. The side of the cylinder is secured by any suitable means to the ends of the arms 25, the head 26 closing the upper end of the cylinder and the head 27 closing the lower end of the cylinder. The outside of the cylinder is provided with a groove 28, said groove consisting of the straight perpendicular sections 29 and the slanting curved sections 30, the flat springs 31 being attached at their upper ends to the upper edges of the slanting groove-sections 30, the lower ends of the said springs 31 extending across the lower portion of the straight perpendicular sections 29 of the groove 28, the object of which will be hereinafter stated.

The upper and lower heads 26 and 27 are provided with the registering perforations 32 and 33—that is, the perforations 32 in the head 26 are in the same perpendicular line as the perforations 33 in the head 27. The perforations 32 and 33 are adapted to enter the spaces between the radially-extending arms 25 of the core 24 when the cylinder-heads 26 and 27 are located in their proper positions. The plunger-rods 34 are adapted to pass perpendicularly through the perforations 32 and 33 of the heads 26 and 27. Each rod 34 is provided at its upper end with the opposite recesses 35, said recesses being adapted to receive the extensions 18 of the grippers 16. Each rod 34 within the cylinder 20 is provided with a fixed collar 36, and the coil-spring 37 is interposed between the under face of the collar 36 and the lower head 27, as illustrated in Fig. 3. The lower end of each rod 34 is provided with a suitable plunger 38, said plunger being preferably screw-threaded to the end of the rod 37, and thus easily removable, the rod 37 being adapted to carry any suitable style of plunger. The annular flange 39 is located at the upper end of each plunger 38, said flange extending beyond the outer sides of the plunger, the object of which will be hereinafter stated.

A perpendicular rod 40 passes through the guides 41 and 42, said guides being attached to the framework of the machine. The upper end of the rod 40 is provided with an angular extension 43, said extension having a perforation receiving the reciprocating rod 9, the said extension 43 being made fast by any suitable means with the rod 9. Between the guides 41 and 42 the rod 40 is provided with an adjustable collar 44, said collar having a finger 45, the said finger 45 being adapted to enter the groove 28 of the cylinder 20. The spring-arms 46 and 47 are suitably attached at their lower ends to stationary points, the said arms being bowed, as shown in Fig. 2, the upper ends of the arms being pivotally connected to the horizontal ring 48, the said ring 48 being located under the line of the reciprocating rod 9. The upper face of the ring 48 is provided with the pins 49, said pins being surrounded by the coil-springs 50.

By referring to Fig. 13 it will be observed that each of the flanges 39 is provided with perforations 51. The said perforations 51 are adapted to receive the pins 49 and the springs 50 when the plunger 38 is caused to descend, as will be hereinafter explained.

The upward movement of the springs 46 and 47 is limited by the stops 52, said stops being provided with elongated perforations 53, through which pass suitable bolts 54, the inner ends of the bolts entering stationary parts of the machine, and thus the stops 52 may be adjusted perpendicularly, if the occasion so requires.

A block 55 is located under the frame 1, said block being in perpendicular alinement with the rod 9. The upper end of the block 55 is provided with a recess 56, said recess extending transversely of the machine.

Having thus described the mechanism for operating the plunger-cylinder and the plungers, I will now describe the mechanism for operating the molds.

A table 57 is suitably arranged, said table having the friction-rollers mounted thereon, the table and rollers virtually forming a track, upon which travel the links of the endless chain 59. The opposite links of the chain 59 are provided with the perforations 60, the links being pivoted together at their ends by means of the pins 61. Each mold 62 is provided on its sides with square or rectangular lugs 63, the said lugs 63 being adapted to enter the perforations 60 of the links of the chain 59. Each link of the chain 59 is provided with the mold, as shown in Fig. 1, and by referring to Fig. 9 it will be observed that the perforations 60 are longer than the lateral dimension of the lugs 63. Thus the said lugs and the molds 62 are permitted to have a slight lateral movement within the link, the object of which will be hereinafter stated. The chain 59 passes over the table 57, the lower edges of the links coming in contact with the peripheries of the friction-rollers 58. The chain 59 then passes around the opposite wheels 64 and 65. The said wheels are similar in construction, and they consist of the radially-extending spokes 66, each spoke having at its outer end a socket or recess 67, said socket or recess being adapted to receive one of the pins 61 of the chain 59. It is therefore obvious that the pins 61 must be set at equal distances apart in order that they may register with the outer ends of the spokes 66 while passing around the wheels 64 and 65. The wheels 64 and 65 are journaled in suitable bearings, and the wheel 65 is provided with a suitable mechanism whereby a revolving motion is transmitted to said wheel, and through the chain 57 a similar motion is transmitted to the wheel 64, and thus the said chain 59 and the molds 62, located thereon, are caused to travel. The mechanism attached to the wheel 65 consists of a ratchet-wheel 68, said wheel 68 being fixed to the axle of the wheel 65. The arm 69 is loosely mounted on the said axle and by the side of the wheel 68. The arm 69 at one end is provided with a weight 70 and at the other end is provided with a dog 71, said dog being adapted to engage the ratchets of the wheel 68. The spring 72 is attached to the arm 69 at one end and bears laterally against the dog 71, as shown in detail in Fig. 12. The arm 67 is provided with an elongated perforation 73, said perforation 73 being adapted to receive a pin 74, whereby the said arm 69 is at intervals caused to move with the rod 75. The upper end of the rod 75 is attached to the arm 76, said arm 76 in turn being attached to the reciprocating rod 9, as shown in Fig. 1. At an intermediate point the rod 75 is provided with a slip-joint 77, said slip-joint consisting of a collar 78, said collar being fixed to the upper portion of the rod 75 and having a stop 79. The lower portion of the rod 75 is also provided with a similar collar 80, the said collar 80 receiving the upper portion of the rod 75 and the collar 78 receiving the lower portion of the rod 75. Thus the lower portion of the said rod 75 will not be operated until the upper portion ascends to such an extent that the stop 79 is brought in contact with the collar 80 and the entire rod 75 moves upward and the mechanism connected therewith is operated.

The bottom of each mold 62 is provided with a valve 81, the stem of the valve protruding beyond the bottom of the mold, as shown in detail in Fig. 9. Near the wheel 64 a spring-arm 82 is located, said arm having one end bifurcated and curved down and secured to the floor of the framework, the other end 83 being slightly upturned and being adapted to come in contact with the ends of the valve-stems 81 as the said molds 62 travel around the wheel 64. The contact between the end 83 of the arm 82 and the stem of the valve 81 of the molds 62 causes the article contained within the mold to be expelled from the mold, and as the mold at this point is practically in an upturned position the said article is deposited upon the belt 84, and the said belt being operated by any suitable means carries the article to the leer.

In connection with the machine as above described a device is provided for finishing and smoothing the edges of table-tumblers and all circular ware requiring a smooth finish. Said device when not in use is adapted to be swung to one side out of the way. It consists of a frame 85, hinged to the frame 1, as illustrated in detail in Fig. 6, the shaft 86 passing perpendicularly through the frame 85, the knob 87 being swiveled at the upper end of the said shaft. A coil-spring 88 is interposed between the lower surface of the knob 87 and the upper face of the frame 85, and the spiral gear-wheel 89 is keyed to the shaft 86, the said shaft, however, having a longitudinal movement through the wheel 89. The bevel-gear 90 is suitably journaled to the frame 85, the gear 89 meshing with the gear of the wheel 90. A suitable means is provided for revolving the wheel 90. The polishing-head 91 is fixed to the lower end of the shaft 86.

Having thus described the construction of the machine, I will next describe its operation.

The rod 9 is caused to reciprocate, as above stated, by any suitable application of power. The molten glass is deposited in the molds 62 when they are above the wheel 65. The reciprocation of the rod 9, transmitting motion through the arm 76 and through the rod 75 and the mechanism thereto attached, causes the wheel 65 to revolve. This brings the mold containing the molten metal over and resting upon the upper end of the block 55, as shown in Fig. 3, the stem of the valve in the mold entering the slot or recess 56, also shown in said figure. The rod 9 then descends, and the lower end of the rod comes in contact with the upper end of the plunger-rod 34. After the springs 19 are fast the coil-springs 17 force the extensions 18 of the grippers 16 into the recesses 35 of the plunger-rod 34, and thus the lower end of the rod 9 is made fast to the plunger-rod 34. As the plunger-rod 34 descends the coil-spring 37 is compressed between the cylinder-rod 27 and the collar 36 at the same time the plunger 37 passes through the opening in the ring 48 and the upper ends of the pins 49 enter the perforations 51 of the flange-plates 39, the said perforations 51 being only of sufficient size to receive the pins 49. The springs 50 are compressed, and thus a sudden contact between the flange-plates 39 and the upper surface of the ring 48 is avoided. When the lower face of the flange-plate 39 comes in contact with the upper face of the ring 48, the said ring 48 is depressed, the springs 46 and 47 giving sufficiently, and the guide 92, attached to the under side of the ring 48, enters the mouth of the mold 62 and causes the said mold 62 to move exactly in alinement with the rod 9, the elongated perforations 60 of the links of the chain 59 permitting this movement, and thus the molds 62 are always brought in perfect alinement irrespective of any expansion or contraction of the said chain 59. At the time that the guide 92 enters the upper portion of the mold 62 the plunger 38 has passed down into the mold and formed the molten metal therein contained into its proper shape. By this time the rod 9 has passed down to its farthest extent, and it then begins to move up. As it moves up the grippers 16 exert a pull on the plunger-rod 34, and at the same time the tension of the spring 37, bearing against the collar 36, assists in forcing the said plunger-rod 34 up. Thus the plunger 38 is lifted from the mold and the article contained therein, the ring 48 preventing the article from following the plunger 38. When the rod 9 is elevated sufficiently, the upper ends of the grippers 16 come in contact with the springs 19, and thus the springs 17 are compressed and the lower ends of the grippers 16 forced apart. Thus the extensions 18 are disengaged from the recesses 35, and the plunger 34 is disconnected from the rod 9. The stops 52 come in contact with the springs 46 and 47, and thus limit the upward movement of the ring 48, and the springs 50 being compressed cause the flange-plates 39 to readily disengage from the ring 48. During the course of descent of the rod 9 the rod 40 also descends, the finger 45 passing down the straight and perpendicular section 29 of the groove 28. At the end of the downward stroke of the rod 9 the finger 45 flits past the end of the spring 31, and thus as the rod 9 ascends and after the springs 19 have engaged the grippers 16 the finger 45 passes up in the curved slanting section 30 of the groove 28, and thus the cylinder 29 is fixed to revolve and another plunger and plunger-rod are brought under the reciprocating rod 9. This operation is repeated indefinitely, and it will be seen that each plunger of the series being operated successively, while not in operation in forming the article, the plungers have a chance to cool, and thus they will not become overheated. At the time that the rod descends the rod 75, through the arm 76, is also caused to descend, and the arm 69 is carried around on the axle of the wheel 65. Thus the dog 71 is slid past a few ratchets on the wheel 68, the spring 72 maintaining the said dog in engagement with the ratchets. When the rod 9 begins to ascend, owing to the slip-joint 77 above described, the said rod 75 is not made to ascend promptly. The said rod does not begin to ascend until the stop 79 comes in contact with the collar 80. This slight interval permits the plunger 38 to clear the top of the mold 62 before the wheel 65 is given a turn, thereby removing the mold 62, that is under the plunger, and substantially in the place thereof another mold. This operation is also repeated indefinitely. The molds containing the completed articles travel toward the wheel 64, and during this time the articles become partially cool, sufficiently so to retain their shape, and when the molds approach the arm 82 the articles are ejected upon the belt 84, as above described. If it is desired to use the device for finishing the upper edges of the articles while the machine is in operation, this can be done by swinging the frame 85 over the path of the molds 62, as shown in Fig. 1. The operator then presses on the knob 87 and causes the shaft 86, together with the polishing-head 91, to descend. The head 91 comes in contact with the upper edge of the article, and by giving the wheel 90 a quick revolution a revolving motion is transmitted to the head 91 through the wheel 89 and the shaft 86, and thus the upper edge of the article is smoothed and finished. The glass at this time being hot, the head 91 is made, preferably, of brass, and therefore it does not stick to the glass, but gives it a highly-polished finish.

By referring to Fig. 9 it will be seen that the lower portion of the table 57 is provided with friction-rollers similar to the rollers 58, located at the top of the table. This lower set of rollers perform the same function as the upper set.

In the fore part of the specification it was stated that this machine was intended to manufacture hollow glassware; but it is not absolutely essential that the ware should be hollow, as it is obvious that the machine could be used for forming almost any kind of glass article, such as lenses, insulators, and the like.

Having thus described the invention, what I claim as new, and desire to secure by Letters Patent, is—

1. A machine such as described, consisting of a reciprocating rod, a revolving cylinder located below said rod, said cylinder carrying a number of plungers and plunger-rods, a mold adapted to be placed in alinement with the reciprocating rod, the cylinder adapted to revolve and successively bring the plungers in alinement with the reciprocating rod and the mold.

2. In a machine such as described, a reciprocating rod, a cylinder carrying a number of plungers and plunger-rods, a mold adapted to be located in alinement with the reciprocating rod, a gripping mechanism located at the end of the reciprocating rod, said cylinder adapted to revolve and bring the plungers successively in alinement with the mold, the reciprocating rod adapted to come in contact with the end of the plunger-rod, the gripping mechanism engaging the end of the plunger-rod.

3. A machine such as described, consisting of a reciprocating rod, a mold adapted to be located in alinement with said rod, a revolving cylinder carrying a number of plungers and plunger-rods, a spring actuating each plunger-rod, a gripping mechanism located at the end of the reciprocating rod, said gripping mechanism adapted to engage the end of the plunger-rod.

4. In a machine such as described, a reciprocating rod, a mold located in alinement with said reciprocating rod, a revolving cylinder carrying a number of plungers and plunger-rods, a gripping mechanism located at the end of the reciprocating rod, said mechanism consisting of pivoted grippers having at their lower ends lateral protrusions, springs actuating the opposite ends of said grippers, each plunger-rod having suitable recesses adapted to receive the protrusions of the grippers, a means for disengaging the protrusions from the recesses of the plunger-rod.

5. In a machine such as described, a reciprocating rod, a mold located in alinement with the reciprocating rod, a revolving cylinder carrying a number of plungers and plunger-rods, a suitable means for revolving said cylinder, a gripping mechanism located at the end of the reciprocating rod, said gripping mechanism being adapted to engage and disengage the plunger-rods, a means for engaging and disengaging the gripping mechanism with the plunger-rod.

6. In a machine such as described, a revolving cylinder suitably journaled in the framework, a means to revolve the cylinder, a number of plungers each having a plunger-rod carried by the cylinder, said plungers being movable perpendicularly independent of each other, a number of moving molds adapted to act successively under the plungers of the cylinder, a reciprocating rod adapted to operate the plunger-rods and plungers successively and cause them to enter the molds.

7. In a machine such as described, a revolving cylinder carrying a number of plungers and plunger-rods, antifrictional devices interposed between said cylinder and the framework of the machine, a number of traveling molds adapted to come successively under one of the plungers of the cylinder, a suitable means for causing said plunger to descend and enter the mold.

8. A machine such as described, consisting of a cylinder adapted to revolve, plungers and plunger-rods carried by said cylinder, a continuous groove located on the exterior of said cylinder, a suitable means for successively operating the plungers and plunger-arms, a reciprocating rod attached to the operating means, a finger carried by said reciprocating arm, said finger entering the continuous groove and being adapted to cause the cylinder to revolve after the operation of each plunger.

9. A machine such as described, consisting of a cylinder, plungers and plunger-rods carried by said cylinder, a continuous groove located on the exterior of the cylinder, said groove consisting of straight perpendicular sections and slanting curved sections, said sections being alternately arranged, a suitable means for operating the plunger and rod, a reciprocating rod attached to said operating means, a finger carried by said reciprocating rod, said finger entering the continuous groove of the cylinder and being adapted to revolve the cylinder after the operation of each plunger.

10. In a machine such as described, a cylinder carrying a number of plungers and plunger-rods, said cylinder having in its upper and lower heads opposite perforations receiving the said rods, springs located within the cylinder and tending to lift said rods, said cylinder adapted to revolve, a suitable means for operating the plunger-rods successively and causing the plungers to enter a mold.

11. In a machine such as described, a cylinder journaled in the framework, said cylinder having a central core with radially-extending arms, the upper and lower heads of the cylinder having opposite perforations, said perforations entering the spaces between the radially-extending arms of the core, plungers having suitable rods, said rods passing through the said opposite perforations in the cylinder-heads, springs located within the cylinder and tending to elevate the plunger-rods, a suitable means for successively operating the plungers and causing them to enter a suitable mold.

12. In a machine such as described, a cylinder journaled in the framework, said cylinder carrying a number of plungers and plunger-rods, means for successively operating the plungers and causing them to enter a mold, the cylinder having on its exterior a continuous groove, said groove consisting of straight perpendicular sections and slanting curved sections, said sections being arranged alternately, a spring located in the upper edge of the slanting curved sections, the lower ends of said springs crossing the straight perpendicular sections, a reciprocating rod attached to the operating mechanism, said rod having a finger, said finger entering said continuous groove and being adapted to revolve the cylinder after the operation of each plunger.

13. In a machine such as described, a mold suitably supported, a ring located above said mold, said ring being spring-supported, a plunger located above the ring, said plunger adapted to descend and depress the ring and seat it in its proper position upon the mold.

14. In a machine such as described, a mold suitably supported, a ring supported above said mold, springs supporting said ring, stops attached to the framework of the machine and adapted to limit the upward movement of the springs, a plunger located above the ring, said plunger being adapted to descend and come in contact with the ring and force the same down in its proper position upon the mold.

15. In a machine such as described, a mold suitably supported, a ring located above said mold, said ring being spring-supporting, adjustable stops attached to the framework of the machine, said stops being adapted to limit the upward movement of the springs, a plunger located above the ring, said plunger being adapted to descend and pass through the ring and seat the same upon the mold.

16. In a machine such as described, a mold suitably supported, a ring located above said mold, a spring-support for the ring, perpendicular pins located on the upper surface of the ring, coil-springs surrounding said pins, the plunger located above the ring, a flange-plate having suitable perforations adapted to receive the pins, the plunger being adapted to descend and pass through the ring and seat the same in its proper position upon the mold.

17. In a machine such as described, a mold suitably supported, a ring located above said mold, a spring-support for said ring, a spring located on the upper surface of the ring, a plunger located above said ring said plunger having a flange-plate, said plunger being adapted to descend and pass through the ring, the flange-plate coming in contact with the spring of the ring, the plunger forcing the ring down and seating it in its proper position upon the mold.

18. In a machine such as described, an endless carrier consisting of a chain, each link of the chain having opposite elongated perforations, a mold adapted to enter each link, each mold having on its sides lugs adapted to enter the elongated perforations of the links, the longitudinal dimensions of the lugs being less than those of the links, wheels suitably journaled, a chain passing around said wheels, a suitable means for operating said wheels, plungers adapted to enter the molds at a specific point.

19. In a machine such as described, an endless conveyer, a number of molds located on said conveyer, a table surrounded by said conveyer, friction-rollers located on said table and supporting the conveyer, wheels suitably journaled, the conveyer passing around said wheels, a means for operating said wheels, a rest surrounded by the conveyer, the molds being adapted to be brought successively upon said rest, plungers adapted to enter the molds when they are upon the rest.

20. A machine such as described, consisting of a conveyer, said conveyer consisting of a chain formed of a number of links, lateral pins connecting the opposite ends of the links, wheels consisting of radially-extending spokes, each spoke having at its end a socket, said sockets being adapted to receive the pins of the links, a suitable means for operating the wheels, molds carried by the links, plungers adapted to enter the molds at a certain specific point.

21. In a machine such as described, an endless conveyer, a number of molds located on said conveyer, wheels suitably journaled, the conveyer passing around said wheels, a means for operating said wheels, plungers adapted to enter the molds at a specific point, each mold being provided in its bottom with a protruding stem, a spring-arm being adapted to come in contact with the protruding stem and expel the contents of the mold, a traveling conveyer located below the mold, said conveyer being adapted to receive the article expelled from the mold.

22. In a machine such as described, consisting of an endless conveyer, molds carried by said conveyer, wheels suitably journaled, said conveyer passing around said wheels, a revolving cylinder located above the conveyer, plungers carried by said cylinder, an operating mechanism adapted to cause the plungers to successively enter the molds, a ratchet mechanism attached to the conveyer-wheels, a rod connected to said mechanism, a slip-joint located on said rod, said rod being attached to the operating mechanism, the slip-joint causing a mold to remain stationary until the plunger has cleared the same in its upward movement.

In testimony whereof I affix my signature in presence of two witnesses.

JOHN T. ROWE.

Witnesses:
JAMES B. SULLIVAN,
GEO. J. HOLL.